US011922187B2

(12) United States Patent
Peled et al.

(10) Patent No.: US 11,922,187 B2
(45) Date of Patent: Mar. 5, 2024

(54) ROBUST APPLICATION PRELOADING WITH ACCURATE USER EXPERIENCE

(71) Applicant: TENSERA NETWORKS LTD., Hod Hasharon (IL)

(72) Inventors: Roee Peled, Ramat Gan (IL); Amit Wix, Raanana (IL)

(73) Assignee: TENSERA NETWORKS LTD., Tel Aviv (IL)

( * ) Notice: Subject to any disclaimer, the term of this patent is extended or adjusted under 35 U.S.C. 154(b) by 78 days.

(21) Appl. No.: 17/681,874

(22) Filed: Feb. 28, 2022

(65) Prior Publication Data

US 2022/0179667 A1 Jun. 9, 2022

Related U.S. Application Data

(63) Continuation of application No. PCT/IB2022/051531, filed on Feb. 22, 2022, which is
(Continued)

(51) Int. Cl.
*G06F 9/445* (2018.01)
*G06F 8/41* (2018.01)
(Continued)

(52) U.S. Cl.
CPC ............. *G06F 9/451* (2018.02); *G06F 8/433* (2013.01); *G06F 9/44521* (2013.01); *G06F 9/4881* (2013.01)

(58) Field of Classification Search
CPC ...... G06F 9/048; G06F 9/445; G06F 9/44521; G06F 9/44578; G06F 9/451;
(Continued)

(56) References Cited

U.S. PATENT DOCUMENTS 6,038,596 A * 3/2000 Baldwin ................... G06F 9/46
709/219
6,807,570 B1 10/2004 Allen et al.
(Continued)

FOREIGN PATENT DOCUMENTS

CN 102063302 A 5/2011
CN 108681475 A 10/2018
(Continued)

OTHER PUBLICATIONS

Lee et al., "CAS: Context-Aware Background Application Scheduling in Interactive Mobile Systems," IEEE Journal on Seleted Areas in Communications, vol. 35, No. 5, pp. 1013-1029, May 2017.
(Continued)

*Primary Examiner* — Alvin H Tan
(74) *Attorney, Agent, or Firm* — Kligler & Associates Patent Attorneys Ltd.

(57) ABSTRACT

A user device includes a display screen and one or more processors. The one or more processors are configured to run an Operating System (OS) that runs user applications, including sending flows to the user applications, each flow including a series of inputs that are sent over time to a given user application and determines a lifecycle of the given user application, to preload-launch a user application, including preloading the user application in a background mode that is invisible on the display screen, and, upon user access to the preloaded user application, transferring the user application to a foreground mode that is visible on the display screen, and, in response to identifying that preload-launching of the user application includes a flow that is predefined as an uncommon flow, to replace the flow with one or more alternative flows that are not defined as uncommon flows.

28 Claims, 4 Drawing Sheets

Related U.S. Application Data a continuation-in-part of application No. 16/968,652, filed as application No. PCT/IB2019/051707 on Mar. 4, 2019.

(60) Provisional application No. 63/193,644, filed on May 27, 2021, provisional application No. 63/160,836, filed on Mar. 14, 2021, provisional application No. 63/158,914, filed on Mar. 10, 2021, provisional application No. 63/152,878, filed on Feb. 24, 2021, provisional application No. 62/801,145, filed on Feb. 5, 2019, provisional application No. 62/638,321, filed on Mar. 5, 2018.

(51) Int. Cl.
    *G06F 9/451*     (2018.01)
    *G06F 9/48*     (2006.01)

(58) Field of Classification Search
    CPC ...... G06F 9/45558; G06F 9/48; G06F 9/4881; G06F 2009/4557; G06F 8/433
    See application file for complete search history.

(56) References Cited

U.S. PATENT DOCUMENTS

| | | |
|---|---|---|
| 7,703,133 B1 * | 4/2010 | Balasubramanian ........................ G06F 21/575 726/17 |
| 8,140,997 B2 | 3/2012 | Nemoto |
| 8,250,228 B1 | 8/2012 | Johansson |
| 8,341,245 B1 | 12/2012 | Roskind et al. |
| 8,418,190 B2 | 4/2013 | Rivard et al. |
| 8,881,033 B2 | 11/2014 | Mentchoukov et al. |
| 9,385,914 B1 | 7/2016 | Britto et al. |
| 9,513,888 B1 | 12/2016 | Fultz et al. |
| 9,565,233 B1 | 2/2017 | Ozuysal et al. |
| 9,959,506 B1 | 5/2018 | Karppanen |
| 9,961,159 B2 | 5/2018 | Yellin et al. |
| 9,979,796 B1 | 5/2018 | Yellin et al. |
| 10,013,497 B1 | 7/2018 | Boodman |
| 10,432,748 B2 | 10/2019 | Yellin et al. |
| 10,459,887 B1 | 10/2019 | Dvortsov et al. |
| 10,613,735 B1 | 4/2020 | Karpe et al. |
| 11,095,743 B2 | 8/2021 | Yellin et al. |
| 11,128,729 B2 | 9/2021 | Yellin et al. |
| 11,715,084 B1 | 8/2023 | Dixon et al. |
| 2003/0101234 A1 | 5/2003 | McBrearty et al. |
| 2003/0195940 A1 | 10/2003 | Basu et al. |
| 2003/0220984 A1 | 11/2003 | Jones et al. |
| 2004/0030882 A1 | 2/2004 | Forman |
| 2005/0066283 A1 | 3/2005 | Kanamaru |
| 2005/0132302 A1 | 6/2005 | Cina |
| 2006/0026636 A1 | 2/2006 | Stark et al. |
| 2006/0101514 A1 | 5/2006 | Milener et al. |
| 2006/0111920 A1 | 5/2006 | Jacobs et al. |
| 2008/0307339 A1 | 12/2008 | Boro et al. |
| 2009/0006671 A1 | 1/2009 | Batson et al. |
| 2009/0037393 A1 | 2/2009 | Fredricksen et al. |
| 2010/0058248 A1 | 3/2010 | Park |
| 2011/0211813 A1 | 9/2011 | Marks |
| 2011/0249668 A1 | 10/2011 | Van Milligan et al. |
| 2012/0023226 A1 | 1/2012 | Petersen et al. |
| 2012/0023506 A1 | 1/2012 | Maeckel et al. |
| 2012/0084343 A1 | 4/2012 | Mir et al. |
| 2012/0137296 A1 | 5/2012 | Chen et al. |
| 2012/0159393 A1 | 6/2012 | Sethi |
| 2012/0167122 A1 | 6/2012 | Koskimies |
| 2012/0278432 A1 | 11/2012 | Luna |
| 2012/0317188 A1 | 12/2012 | Fredricksen et al. |
| 2012/0324481 A1 | 12/2012 | Xia et al. |
| 2013/0019159 A1 | 1/2013 | Civelli et al. |
| 2013/0031204 A1 | 1/2013 | Graham et al. |
| 2013/0120294 A1 | 5/2013 | Sun et al. |
| 2013/0173513 A1 | 7/2013 | Chu et al. |
| 2013/0185633 A1 | 7/2013 | Bunker et al. |
| 2013/0238751 A1 | 9/2013 | Raleigh et al. |
| 2013/0263023 A1 | 10/2013 | Goodwin et al. |
| 2013/0275899 A1 | 10/2013 | Schubert et al. |
| 2013/0283283 A1 | 10/2013 | Wang et al. |
| 2014/0053057 A1 | 2/2014 | Reshadi et al. |
| 2014/0094163 A1 | 4/2014 | Widdowson et al. |
| 2014/0162793 A1 | 6/2014 | Quan et al. |
| 2014/0188932 A1 | 7/2014 | Kalita et al. |
| 2014/0201673 A1 | 7/2014 | Dunn |
| 2014/0280485 A1 | 9/2014 | A Hummaida et al. |
| 2014/0359442 A1 | 12/2014 | Lin |
| 2014/0372356 A1 | 12/2014 | Bilal et al. |
| 2014/0373032 A1 | 12/2014 | Merry et al. |
| 2015/0026415 A1 | 1/2015 | Clausen et al. |
| 2015/0045921 A1 | 2/2015 | Stewart et al. |
| 2015/0046519 A1 | 2/2015 | Shukla et al. |
| 2015/0193395 A1 | 7/2015 | Nicolaou et al. |
| 2015/0207852 A1 | 7/2015 | Boodman et al. |
| 2015/0208205 A1 | 7/2015 | Chan et al. |
| 2015/0215816 A1 | 7/2015 | Abou-Elkheir et al. |
| 2015/0281147 A1 | 10/2015 | Wang et al. |
| 2015/0347615 A1 | 12/2015 | McGushion et al. |
| 2015/0371142 A1 | 12/2015 | Jain |
| 2015/0372933 A1 | 12/2015 | Cai et al. |
| 2016/0012104 A1 | 1/2016 | Petrov |
| 2016/0057167 A1 | 2/2016 | Bach |
| 2016/0085583 A1 | 3/2016 | Goodson |
| 2016/0103608 A1 | 4/2016 | Nukala et al. |
| 2016/0227464 A1 | 8/2016 | Senarath et al. |
| 2016/0259623 A1 | 9/2016 | Sumner et al. |
| 2016/0259656 A1 | 9/2016 | Sumner et al. |
| 2016/0344679 A1 | 11/2016 | Lane et al. |
| 2017/0011681 A1 | 1/2017 | Bathiche et al. |
| 2017/0031869 A1 | 2/2017 | Franczyk et al. |
| 2017/0032568 A1 | 2/2017 | Gharpure et al. |
| 2017/0046235 A1 | 2/2017 | Straub et al. |
| 2017/0126833 A1 | 5/2017 | DeLuca et al. |
| 2017/0278477 A1 | 9/2017 | Jeong et al. |
| 2017/0293465 A1 | 10/2017 | Kotteri et al. |
| 2017/0371685 A1 | 12/2017 | Tanaka et al. |
| 2018/0129537 A1 | 5/2018 | Kurtzman et al. |
| 2018/0212741 A1 | 7/2018 | Lindoff et al. |
| 2018/0241837 A1 | 8/2018 | Yellin et al. |
| 2018/0246862 A1 | 8/2018 | Burkard et al. |
| 2018/0293087 A1 | 10/2018 | Lee et al. |
| 2018/0364890 A1 | 12/2018 | Lee et al. |
| 2019/0065144 A1 | 2/2019 | Sumner et al. |
| 2019/0087205 A1 | 3/2019 | Guday |
| 2019/0100152 A1 | 4/2019 | Shastry |
| 2019/0188005 A1 * | 6/2019 | Chen ..................... G06N 20/00 |
| 2019/0188012 A1 | 6/2019 | Chen et al. |
| 2019/0188013 A1 | 6/2019 | Krishna et al. |
| 2019/0196849 A1 | 6/2019 | Chen et al. |
| 2019/0205159 A1 | 7/2019 | Wen et al. |
| 2019/0221224 A1 | 7/2019 | Heitkamp et al. |
| 2019/0361581 A1 | 11/2019 | Wang et al. |
| 2019/0370022 A1 | 12/2019 | Han et al. |
| 2019/0370095 A1 | 12/2019 | Chen et al. |
| 2020/0159597 A1 | 5/2020 | Yellin et al. |
| 2020/0159816 A1 | 5/2020 | Bostrom et al. |
| 2020/0183822 A1 | 6/2020 | Bates |
| 2020/0225818 A1 | 7/2020 | Ozuysal |
| 2020/0336514 A1 | 10/2020 | Momchilov et al. |
| 2020/0342338 A1 | 10/2020 | Huang |
| 2020/0401418 A1 | 12/2020 | Regev et al. |
| 2021/0103447 A1 | 4/2021 | Wei et al. |
| 2021/0149689 A1 | 5/2021 | Jung et al. |
| 2021/0224085 A1 | 7/2021 | Moore |
| 2021/0304096 A1 | 9/2021 | Kirubakaran et al. |
| 2021/0323908 A1 | 10/2021 | Yellin et al. |
| 2021/0329088 A1 | 10/2021 | Yellin et al. |
| 2021/0329089 A1 | 10/2021 | Yellin et al. |
| 2021/0329090 A1 | 10/2021 | Yellin et al. |
| 2021/0329091 A1 | 10/2021 | Yellin et al. |
| 2021/0385295 A1 | 12/2021 | Yellin et al. |
| 2022/0210264 A1 | 6/2022 | Jung et al. |
| 2022/0221998 A1 | 7/2022 | Xu |

(56) References Cited

U.S. PATENT DOCUMENTS

| | | | |
|---|---|---|---|
| 2022/0413695 A1 | 12/2022 | Guan et al. | |
| 2023/0018798 A1 | 1/2023 | Coffman et al. | |
| 2023/0054174 A1* | 2/2023 | Peled | G06F 3/0481 |
| 2023/0135295 A1 | 5/2023 | Cha et al. | |

FOREIGN PATENT DOCUMENTS

| | | |
|---|---|---|
| CN | 108920156 A | 11/2018 |
| CN | 108958828 A | 12/2018 |
| KR | 20160116910 A | 10/2016 |
| WO | 2015169188 A1 | 11/2015 |
| WO | 2018055506 A1 | 3/2018 |
| WO | 2018234967 A1 | 12/2018 |
| WO | 2019082042 A1 | 5/2021 |
| WO | 2021161174 A1 | 8/2021 |

OTHER PUBLICATIONS

U.S. Appl. No. 17/567,183 Office Action dated Dec. 30, 2022.
U.S. Appl. No. 17/739,122 Office Action dated Feb. 1, 2023.
EP Application # 20845959.4 Search Report dated Feb. 2, 2023.
U.S. Appl. No. 17/624,357 Office Action dated Mar. 13, 2023.
U.S. Appl. No. 17/567,187 Office Action dated Mar. 27, 2023.
U.S. Appl. No. 17/739,122 Office Action dated Sep. 21, 2022.
U.S. Appl. No. 17/363,047 Office Action dated Nov. 1, 2022.
International Application # PCT/IB2020/057046 Search Report dated Nov. 17, 2020.
U.S. Appl. No. 17/363,047 Office Action dated Feb. 11, 2022.
U.S. Appl. No. 17/363,036 Office Action dated Mar. 4, 2022.
Peled et al., U.S. Appl. No. 17/567,183, filed Jan. 3, 2022.
Peled et al., U.S. Appl. No. 17/567,187, filed Jan. 3, 2022.
U.S. Appl. No. 17/363,058 Office Action dated Mar. 21, 2022.
"Understand the Activity Lifecycle," Android Developers, pp. 1-21, last updated Oct. 27, 2021, as downloaded from https://developer.android.com/guide/components/activities/activity-lifecycle.
International Application # PCT/IB2021/060789 Search Report dated Mar. 21, 2022.
International Application # PCT/IB2021/061606 Search Report dated Apr. 7, 2022.
International Application # PCT/IB2021/060789 filed Nov. 21, 2021.
International Application # PCT/IB2021/061606 filed Dec. 13, 2021.
International Application # PCT/IB2022/050581 filed Jan. 24, 2022.
International Application # PCT/IB2022/051531 filed Feb. 22, 2022.
Peled et al., U.S. Appl. No. 17/624,357, filed Jan. 3, 2022.
U.S. Appl. No. 17/363,039 Office Action dated May 11, 2022.
International Application # PCT/IB2022/050581 Search Report dated May 25, 2022.
International Application # PCT/IB2022/051531 Search Report dated Jun. 19, 2022.
U.S. Appl. No. 17/403,908 Office Action dated Jul. 21, 2022.
U.S. Appl. No. 17/363,047 Office Action dated Jul. 26, 2022.
U.S. Appl. No. 16/968,652 Office Action dated Jul. 10, 2023.
U.S. Appl. No. 17/849,644 Office Action dated Oct. 5, 2023.
CN Application # 2021800134875 Office Action dated Dec. 12, 2023.
U.S. Appl. No. 17/582,025 Office Action dated Nov. 6, 2023.
U.S. Appl. No. 17/797,130 Office Action dated Dec. 26, 2023.

* cited by examiner

ROBUST APPLICATION PRELOADING WITH ACCURATE USER EXPERIENCE

CROSS-REFERENCE TO RELATED APPLICATIONS

This application is a continuation of PCT Application PCT/IB2022/051531, filed Feb. 22, 2022, which claims the benefit of U.S. Provisional Patent Application 63/152,878, filed Feb. 24, 2021, U.S. Provisional Patent Application 63/158,914, filed Mar. 10, 2021, U.S. Provisional Patent Application 63/160,836, filed Mar. 14, 2021, and U.S. Provisional Patent Application 63/193,644, filed May 27, 2021.

This application is also a continuation-in-part of U.S. patent application Ser. No. 16/968,652, filed Aug. 10, 2020, filed in the national phase of PCT Application PCT/IB2019/051707, filed Mar. 4, 2019, which claims the benefit of U.S. Provisional Patent Application 62/638,321, filed Mar. 5, 2018, and U.S. Provisional Patent Application 62/801,145, filed Feb. 5, 2019.

The disclosures of these related applications are incorporated herein by reference.

FIELD OF THE INVENTION

The present invention relates generally to handling of user applications in user devices, and particularly to methods and systems for preloading of applications and content.

BACKGROUND OF THE INVENTION

In applications ("apps") that run on user devices such as smartphones, one of the major factors affecting user experience is the latency of the User Interface (UI). Various techniques have been proposed for reducing latency and providing a more responsive UI. Some techniques involve prefetching of content. Other techniques involve background preloading of apps. Yet other techniques involve pre-rendering of an app's UI.

SUMMARY OF THE INVENTION

An embodiment of the present invention that is described herein provides a user device including a display screen and one or more processors. The one or more processors are configured to run an Operating System (OS) that runs user applications, including sending flows to the user applications, each flow including a series of inputs that are sent over time to a given user application and determines a lifecycle of the given user application, to preload-launch a user application, including preloading the user application in a background mode that is invisible on the display screen, and, upon user access to the preloaded user application, transferring the user application to a foreground mode that is visible on the display screen, and, in response to identifying that preload-launching of the user application includes a flow that is predefined as an uncommon flow, to replace the flow with one or more alternative flows that are not defined as uncommon flows.

In some embodiments, the one or more processors are configured to identify the uncommon flow in the preload-launching of the user application, by identifying that the user access is within a predefined time period after a preload-initiated action. In an embodiment, the preload-initiated action is a beginning of preloading the user application. In a disclosed embodiment, the one or more alternative flows include a flow that moves the user application silently to a front, without triggering callbacks of the user application.

In some embodiments, the one or more alternative flows include the following sequence of flows: a first flow that launches the user application; a second flow that moves the user application to the background mode; and a third flow that, upon user entry, moves the user application from the background mode to a foreground mode.

In some embodiments, the one or more processors are configured to identify the uncommon flow in the preload-launching of the user application, by identifying that the user accesses the user application following one of: killing of a process of the user application by the OS; and destroying of a User Interface (UI) display of the user application by the OS. In an example embodiment, the one or more processors are configured to replace the uncommon flow with an alternative flow that finishes the user application and one or more User Interface (UI) displays of the user application. In an embodiment, in response to identifying the uncommon flow, the one or more processors are configured to terminate preloading of the user application.

There is additionally provided, in accordance with an embodiment of the present invention, a user device including a display screen and one or more processors. The one or more processors are configured to preload one or more user applications in a background mode, in which User Interface (UI) displays associated with preloaded user applications are invisible on the display screen, to detect a launch of a UI display that is associated with a given preloaded user application, to assess whether the UI display is a preload-initiated UI display that is invoked due to preloading of the given user application, or whether the UI display is a user-initiated UI display that is invoked due to an action by the user, if the UI display is assessed to be a preload-initiated UI display, to handle the UI display using a first handling scheme, and if the UI display is assessed to be a user-initiated UI display, to handle the UI display using a second handling scheme, different from the first handling scheme.

In an embodiment, the one or more processors are configured to assess whether the UI display is a preload-initiated UI display or a user-initiated UI display, depending on whether the user has interacted with the user application during a predefined recent time period.

In an example embodiment, an Operating System (OS) of the user device includes logic that decides, depending on whether the user has recently interacted with the user application, whether to restrict launching of UI displays by the user application, and the one or more processors are configured to assess whether the UI display is a preload-initiated UI display or a user-initiated UI display by mimicking at least part of the logic of the OS.

In an embodiment, the one or more processors are configured to assess whether the UI display is a preload-initiated UI display or a user-initiated UI display by evaluating a sequence of criteria, and terminating the sequence when a given criterion in the sequence produces a conclusive decision of whether the UI display is a preload-initiated UI display or a user-initiated UI display. In an embodiment, the one or more processors are configured to decide that the UI display is a user-initiated UI display in response to determining that the launch is not restricted by a UI-display launch restriction defined in an Operating System (OS) of the user device.

In a disclosed embodiment, the one or more processors are configured to decide that the UI display is a preload-initiated UI display in response to determining that the launch was performed directly by a preload mechanism in the user device. In an example embodiment, the one or more processors are configured to check whether the launch was performed by another UI display, to decide that the UI display is a preload-initiated UI display in response to determining that the other UI display is preload-initiated, and to decide that the UI display is a user-initiated UI display in response to determining that the other UI display is user-initiated.

In another embodiment, the one or more processors are configured to decide that the UI display is a user-initiated UI display in response to determining that the launch was performed by another user application, different from the given user application. In yet another embodiment, the one or more processors are configured to decide that the UI display is a user-initiated UI display in response to determining that the given user application does not have a preloaded task. In still another embodiment, the one or more processors are configured to decide that the UI display is a user-initiated UI display in response to determining that a target task of the UI display already exists and is not a preloaded task.

There is also provided, in accordance with an embodiment of the present invention, a user device including a display screen and one or more processors. The one or more processors are configured to preload a user application in a background mode that is invisible on the display screen, and, upon user access to the preloaded user application, to display on the display screen a preload starting window, to execute, while the preload starting window is displayed, user-entry actions for preparing the user application for interaction with the user, and, upon completion of the user-entry actions, to remove the preload starting window and enable the user to interact with the user application.

In some embodiments, upon completion of the user-entry actions, the one or more processors are configured to replace the preload starting window with a top User Interface (UI) display of the user application on the display screen. In an example embodiment, the one or more processors are configured to determine a theme of the top UI interface or of the user application, and to build the preload starting window using the determined theme.

In an embodiment, the one or more processors are configured to acquire a snapshot image of the user application during preloading, and to use the snapshot image as the preload starting window. In another embodiment, the one or more processors are configured to build the preload starting window having a same user experience as a starting window used for non-preloaded user applications. In a disclosed embodiment, the one or more processors are configured to build the preload starting window having a same user experience as a first User Interface (UI) display that the user would have seen when launching the user application without preloading.

There is further provided, in accordance with an embodiment of the present invention, a user device including a display screen and one or more processors. The one or more processors are configured to run an Operating System (OS) that supports multiple application containers, including (i) a target container that is made visible on the display screen and (ii) one or more virtual containers that are not visible on the display screen, that manages a respective focus state for each of the target container and the virtual containers, that preloads a user application invisibly to a user, by rendering the application to a virtual container among the virtual containers, including managing the focus state of the virtual container, and that, upon user access to the preloaded user application, transfers the user application to the target container, including managing the focus state of the target container.

In an embodiment, the one or more processors are configured to assign focus to a window using a same logic for preloaded and non-preloaded user applications. In an embodiment, the one or more processors are configured to define a given window as ineligible for receiving focus using a same logic, regardless of whether the given window is preloaded or non-preloaded.

There is additionally provided, in accordance with an embodiment of the present invention, a method including, in a user device, running an Operating System (OS) that runs user applications, including sending flows to the user applications, each flow including a series of inputs that are sent over time to a given user application and determines a lifecycle of the given user application. A user application is preload-launched, including preloading the user application in a background mode that is invisible on a display screen of the user device, and, upon user access to the preloaded user application, transferring the user application to a foreground mode that is visible on the display screen. In response to identifying that preload-launching of the user application includes a flow that is predefined as an uncommon flow, the flow replaced with one or more alternative flows that are not defined as uncommon flows.

There is also provided, in accordance with an embodiment of the present invention, a method including, in a user device, preloading one or more user applications in a background mode, in which User Interface (UI) displays associated with preloaded user applications are invisible on a display screen of the user device. A launch of a UI display, which is associated with a given preloaded user application, is detected. An assessment is made whether the UI display is a preload-initiated UI display that is invoked due to preloading of the given user application, or whether the UI display is a user-initiated UI display that is invoked due to an action by the user. If the UI display is assessed to be a preload-initiated UI display, the UI display is handled using a first handling scheme. If the UI display is assessed to be a user-initiated UI display, the UI display is handled using a second handling scheme, different from the first handling scheme.

There is further provided, in accordance with an embodiment of the present invention, a method including, in a user device, preloading a user application in a background mode that is invisible on a display screen of the user device. Upon user access to the preloaded user application, a preload starting window is displayed on the display screen. While the preload starting window is displayed, user-entry actions are executed, for preparing the user application for interaction with the user. Upon completion of the user-entry actions, the preload starting window is removed and interaction of the user with the user application is enabled.

There is additionally provided, in accordance with an embodiment of the present invention, a method including, in a user device, running an Operating System (OS) that supports multiple application containers, including (i) a target container that is made visible on the display screen and (ii) one or more virtual containers that are not visible on the display screen, and that manages a respective focus state for each of the target container and the virtual containers. Using the OS, a user application is preloaded invisibly to a user, by rendering the application to a virtual container among the virtual containers, including managing the focus state of the virtual container. Upon user access to the preloaded user application, the user application is transferred to the target container, including managing the focus state of the target container.

The present invention will be more fully understood from the following detailed description of the embodiments thereof, taken together with the drawings in which:

DETAILED DESCRIPTION OF EMBODIMENTS

Overview and Definitions

Figure 1:
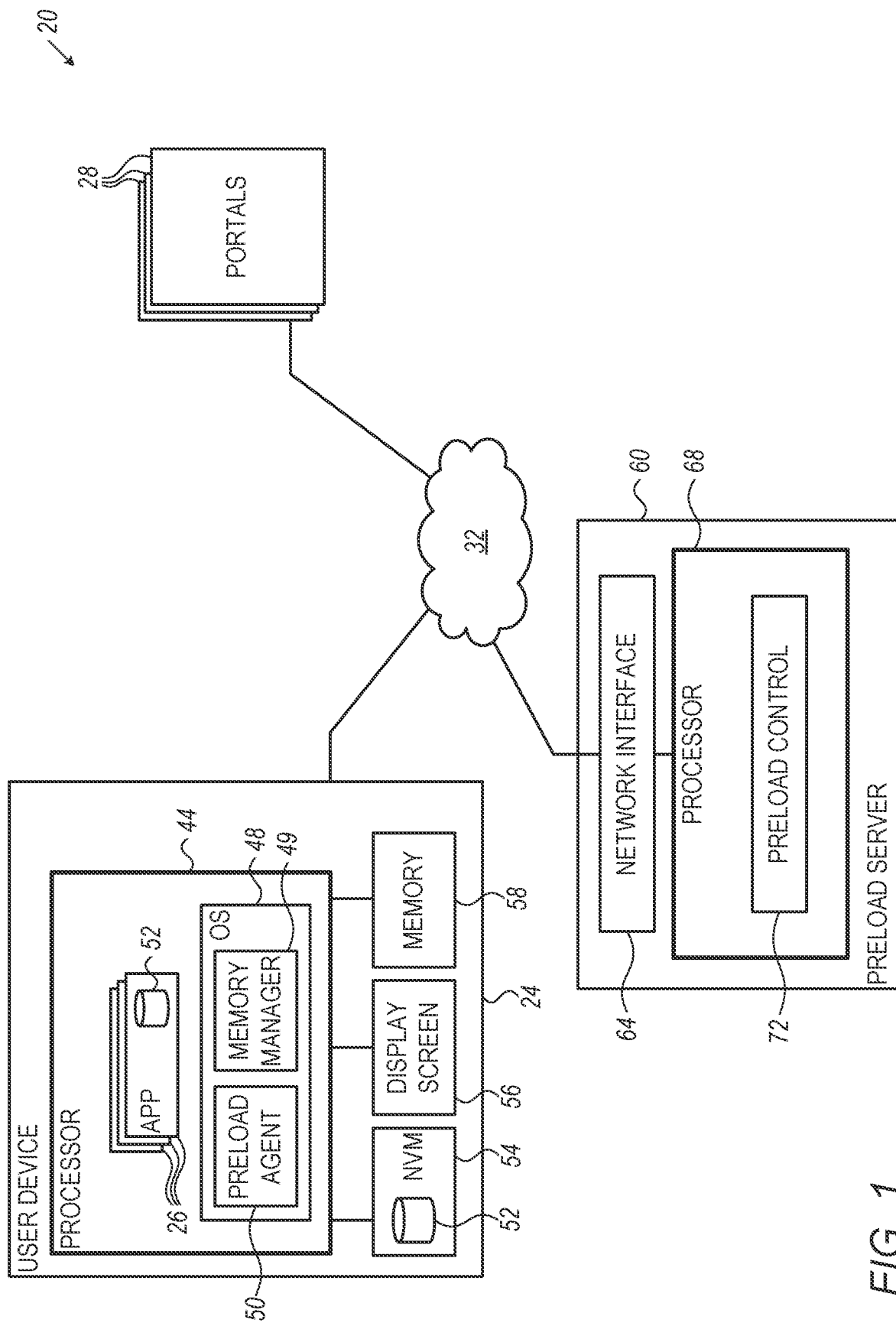
FIG. 1 is a block diagram that schematically illustrates a communication system that employs preloading, in accordance with an embodiment of the present invention.

The present disclosure refers to preloading of applications ("apps") and app components such as User Interface (UI) Displays. In the present context, the term "preloading" refers to the process of loading, launching and at least partially running an app in a background mode unnoticeably to the user, not in response to a request from the user to interact with the app. App components that may be preloaded comprise, for example, the main feed of the app, other UI displays of the app, and/or in-app content, i.e., app content that is not immediately visible to the user upon launching the app. App preloading may involve, for example, pre-rendering of one or more UI displays of the app in the background.

The term "pre-rendering" refers to the process of constructing a UI display of an app in the background mode. Pre-rendering is considered herein to be a component of a preloading operation. Pre-rendering may involve UI tasks that modify the UI display, and/or UI tasks that do not directly modify the UI display but are prerequisite to such modification or are synced to modification of the UI display in the background. Thus, for example, initialization or preparatory tasks that are performed when preloading an app and preparing to initialize or modify a UI display of the app are also regarded herein as pre-rendering tasks.

Certain aspects of preloading and pre-rendering are addressed in PCT International Publication WO 2018/055506, entitled "An Optimized CDN for the Wireless Last Mile," filed Sep. 19, 2017; in U.S. patent application Ser. No. 16/968,652, entitled "Application Preloading in the Presence of User Actions," filed Aug. 10, 2020; in PCT International Publication WO 2021/161174, entitled "Preloading of Applications and In-Application Content in User Devices," filed Feb. 10, 2021; in PCT International Publication WO 2021/019415, entitled "Pre-Rendering of Application User-Interfaces in User Devices," filed Jul. 26, 2020; and in PCT International Publication WO 2019/082042, entitled "Audio Inhibition of Applications in Background Mode, Pre-Loading and Refreshing Thereof," filed Oct. 21, 2018, whose disclosures are incorporated herein by reference.

The term "UI display" in this context refers to a logical UI element—A view or a window that is used by the app to enable interaction with the user. In the Android Operating System (OS), for example, UI displays are referred to as "views" or "activities." The description that follows will refer mainly to the Android OS and to activities, by way of example. Activities are commonly maintained in "tasks". A task typically comprises a container that stores, as a stack, records of activities that users interact with when performing a certain job.

Embodiments of the present invention that are described herein provide improved methods and systems for preloading of user applications ("apps") and their content in user devices. Some disclosed embodiments have to do with preloading and launching of apps while avoiding uncommon, and therefore error-prone, flows. Other embodiments relate to distinguishing between preload-initiated and user-initiated launching of UI displays. Yet other embodiments have to do with generating and displaying temporary windows during preload. Other disclosed embodiments relate to managing of 'focus' state for preloaded apps based on per-display 'focus' state.

System Description

FIG. 1 is a block diagram that schematically illustrates a communication system 20 that employs preloading, in accordance with an embodiment of the present invention.

System 20 comprises a user device 24, which runs one or more user applications ("apps") 26. Device 24 may comprise any suitable wireless or wireline device, such as, for example, a cellular phone or smartphone, a wireless-enabled laptop or tablet computer, a desktop personal computer, a video gaming console, a smart TV, a wearable device, an automotive user device, or any other suitable type of user device that is capable of presenting content to a user. The figure shows a single user device 24 for the sake of clarity. Real-life systems typically comprise a large number of user devices of various kinds.

In the present context, the terms "user application," "application" and "app" are used interchangeably, and refer to any suitable computer program that runs on the user device and may be invoked (activated) by the user. Some apps 26 may be dedicated, special-purpose applications such as game apps. Other apps 26 may be general-purpose applications such as Web browsers.

In some embodiments, although not necessarily, apps 26 are provided by and/or communicate with one or more network-side servers, e.g., portals 28, over a network 32. Network 32 may comprise, for example a Wide Area Network (WAN) such as the Internet, a Local Area Network (LAN), a wireless network such as a cellular network or Wireless LAN (WLAN), or any other suitable network or combination of networks.

In the present example, user device 24 comprises a processor 44 that carries out the various processing tasks of the user device. Among other tasks, processor 44 runs an Operating System (OS) 48, which in turn runs apps 26. The embodiments described herein refer mainly to the Android OS. The disclosed techniques, however, are applicable to any other suitable OS that may run on user devices, e.g., iOS, Windows, Linux and the like. OS 48 comprises, among other components (i) a software component referred to as a memory manager 49, which manages the use of memory, and (ii) a software component referred to as a preload agent 50, which handles preloading of apps. Apps 26, OS 48, memory manager 49 and preload agent 50 are drawn schematically inside processor 44, to indicate that they comprise software running on the processor.

In addition, user device 24 comprises a Non-Volatile Memory (NVM) 54, e.g., a Flash memory. NVM 54 may serve, inter alia, for storing a cache memory 52 for caching content associated with apps. In some embodiments the user device uses a single cache 52. In other embodiments, also depicted schematically in the figure, a separate cache memory 52 may be defined per app. Hybrid implementations, in which part of cache 52 is centralized and some is app-specific, are also possible. For clarity, the description that follows will refer simply to "cache 52", meaning any suitable cache configuration.

User device 24 further comprises a display screen 56 for presenting visual content to the user, and an audio output device (e.g., speaker and/or headset output) for sounding audio to the user. Each of screen 56 and the audio output device is also referred to generally as an "output device" of user device 24. User device 24 further comprises a suitable network interface (not shown in the figure) for connecting to network 32. This network interface may be wired (e.g., an Ethernet Network Interface Controller—NIC) or wireless (e.g., a cellular modem or a Wi-Fi modem). User device 24 further comprises a volatile memory 58, e.g., Random Access Memory (RAM), for storing apps, app components, data, and/or any other suitable information.

In the example embodiment of FIG. 1, although not necessarily, system 20 further comprises a preload server 60 that performs preloading-related tasks on the network side. Server 60 comprises a network interface 64 for communicating over network 32, and a processor 68 that carries out the various tasks of the preload server. In the present example, processor 68 runs a preload control unit 72 that carries out network-side preloading-related tasks.

Network-side preloading-related tasks may comprise, for example, deciding which apps to preload and when, choosing whether and which in-app content to preload, deciding how much of an app component to preload (e.g., only executing some initial executable code, or pre-rendering of the app's user interface and/or deciding on the duration of foreground simulation). Another example is a "whitelist" of apps permitted to undergo preloading. In an embodiment, preload server 60 may be implemented as a cloud-based application.

In the embodiments described herein, for the sake of clarity, preloading tasks are described as being carried out by processor 44 of user device 24. Generally, however, preloading tasks may be carried out by processor 44 of device 24, by processor 68 of server 60, or both.

Preloading an app 26 may involve preloading any app element such as executable code associated with the app, e.g., launch code, app feed, app landing page, various UI elements associated with the app, content associated with the app, app data associated with the app, and/or code or content that is reachable using the app by user actions such as clicks ("in-app content"). Pre-rendering of content may involve background processing of any suitable kind of UI display, or a portion thereof. In Android terminology, for example, pre-rendering may comprise background processing of one or more Android Activities. In the background mode, UI elements associated with the app are not presented to the user on display screen 56, i.e., are hidden from the user. When the user invokes a previously-preloaded app, the user device switches to run the app in a foreground mode that is visible to the user. (The terms "background mode" and "foreground mode" are referred to herein simply as "background" and "foreground," for brevity.)

The configurations of system 20 and its various elements shown in FIG. 1 are example configurations, which are chosen purely for the sake of conceptual clarity. In alternative embodiments, any other suitable configurations can be used. For example, in some embodiments the preloading tasks may be implemented entirely in processor 44 of user device 24, in which case subsystem 60 may be eliminated altogether.

Preload agent 50 may be implemented in a software module running on processor 44, in an application running on processor 44, in a Software Development Kit (SDK) embedded in an application running on processor 44, as part of the OS running on processor 44 (possibly added to the OS by the user-device vendor or other party), in a proxy server running on processor 44, using a combination of two or more of the above, or in any other suitable manner. In most of the description that follows, preload agent 50 is assumed to be part of OS 48 of user device 24.

Although the embodiments described herein refer mainly to human users, the term "user" refers to machine users, as well. Machine users may comprise, for example, various host systems that use wireless communication, such as in various Internet-of-Things (IoT) applications.

The different elements of system 20 may be implemented using suitable software, using suitable hardware, e.g., using one or more Application-Specific Integrated Circuits (ASICs) or Field-Programmable Gate Arrays (FPGAs), or using a combination of hardware and software elements. Cache 52 may be implemented using one or more memory or storage devices of any suitable type. In some embodiments, preload agent 50 and/or preloading server 60 may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

App Preloading Via Common Launch Flows

One of the challenges in preloading an app is the possibility of encountering uncommon flows, as will be defined below.

In the present context, the term "flow" refers to a series of inputs, which are sent over time from the OS to an app and determine the app's lifecycle. The launch and subsequent lifecycle of an app may involve various different flows, depending on various aspects such as the sequence of user actions performed with respect to the app or the user device in general, the state of the user device and environment, and previous events occurring in the app.

Typically OS 48 defines a set of "possible" flows that an app is required to support. For example, in the Android OS, the flow OnCreate→OnStart→OnResume is defined as possible. The flow OnCreate→OnResume→OnStart, on the other hand, may be defined as impossible.

Some flows, although defined as possible, may be uncommon, whereas other possible flows may be common. In the present context, the term "common flow" refers to a flow that is consistently reproducible using normal user behavior. An uncommon flow, by the same token, is a flow that is not consistently reproducible using normal user behavior. Typically, an uncommon flow is a flow that the app is formally required to support, but which may not be supported in practice, at least not consistently or not in full, since it rarely occurs in normal situations.

For example, flows that depend on OS operations that appear unexpected or random from the app's perspective, like killing the app, are typically considered uncommon. Flows that depend on unreasonable behavior, such as a flow that goes through the inputs launch→home→launch within one second, are also considered uncommon.

In practice, invoking an uncommon flow tends to be more likely to trigger defects and suboptimal behavior in the app than a common flow. Moreover, defects or misbehavior encountered in uncommon flows tend to be more serious than in common flows. This phenomenon has various reasons. In many cases, the set of possible flows can be very large, with some of the flows being invoked far more often than others. App developers with limited time and resources may invest in handling the more common flows while possibly neglecting the uncommon ones. In some cases the app developer may even be unaware of the existence of certain uncommon flows. Moreover, uncommon flows may be harder to reproduce in a controlled test environment. Uncommon flows also typically receive little or no feedback from users.

A naive implementation would preload an app using any suitable flows, regardless of whether a given flow is common or uncommon. In view of the foregoing, however, it is highly desirable that preloading of an app will utilize common flows to the largest extent possible, and aim to avoid uncommon flows. Otherwise, some apps may fail to preload properly and may crash or misbehave.

In some embodiments of the present invention, preload agent 50 controls the preload process, and the subsequent handling of user entry to the app, in a manner that minimizes the use of uncommon flows.

The description that follows will refer to "preload-launching" of an app and to "Preload Launch Scope" (PLS). These terms, which are used interchangeably herein, refer to the complete process of (i) preloading an app in a background mode, including prefetching of content and pre-rendering of UI displays as needed, and (ii) handling a subsequent access of the user to the preloaded app, including transferal of the app to a foreground mode.

In some embodiments, one or more flows are defined as uncommon flows. While preloading an app, if preload agent 50 identifies that the preload-launching process comprises a flow that is defined as an uncommon flow, the preload agent replaces the flow with one or more alternative flows that are not defined as uncommon flows.

In other embodiments, agent 50 is pre-programmed to replace an uncommon flow with one or more common flows.

In some embodiments the preload agent does not permit any use of uncommon flows. For example, if it is impossible to perform a certain action in the PLS using common flows, the preload agent may terminate the preload-launch process altogether. In other embodiments, the preload agent reduces the use of uncommon flows, but does not eliminate them completely.

Consider, for example, the following set of common launch flows:
1. Launching an app from scratch, e.g., via a single click on the app launcher.
2. Moving the existing task of the app from the background to the foreground.
3. Moving the task of the app from the foreground to the background.

In an example scenario, after preloading is complete, agent 50 moves the preloaded app to the background. The PLS in this case can be implemented using three common flows:
a) Preload the app (by invoking flow 1 above).
b) After preloading is complete, move the app to the background (by invoking flow 3 above).
c) On user entry, move the backgrounded-preloaded app to the foreground (by invoking flow 2 above).

Avoiding Uncommon Flows Due to Successive Preload-Initiated and User-Initiated Launches Consider a scenario in which agent 50 begins preloading an app, and the user enters the app shortly thereafter (e.g., one second after preloading began). In such a case, a conventional preload technique may force the app to handle an uncommon flow comprising two closely-spaced requests to launch the app, wherein the second request occurs while the app is already in the foreground. When the second request arrives, the app may be in its initial stages of loading, such as during its "splash screen" stage, and may not expect another request at this time. A human user is highly unlikely to issue two such quick requests during regular usage. In preload, such an occurrence is quite feasible.

The conventional PLS in this scenario comprises the following two flows, the second flow being uncommon:
1. Launching an app from scratch.
2. Launching an existing app, which is already in the foreground, possibly in an initial stage of loading.

Note that both the preload operation and the user-entry may be implemented via intents, as in the Android OS, resulting in two quick requests (intents) to launch the app.

In various embodiments, agent 50 may modify the PLS in various ways to include only common flows. In one example, if user-entry occurs quickly after preload starts, agent 50 will move the app to the background and then immediately to the foreground.

Note that in such a case, it may be suboptimal to first move the app to the background on user-entry, e.g., because this will cause a delay while the user is waiting and/or cause audio-visual glitches or other undesired artifacts.

Therefore, in some embodiments, if user-entry happens quickly after preload starts, agent 50 will replace the second launch request with a silent operation to move the app to the front, without triggering any app callbacks. This solution bypasses the uncommon flow and improves performance, as fewer events happen in the app.

Note that generally, in regular usage, it would be considered invalid behavior of the OS to replace a launch request with a silent move-to-front. In this specific case, such a replacement is correct because the previous launch occurred very recently, and therefore the user will still see the result of a single, very recent launch, as expected. The rationale behind the above technique holds provided that the "user-access" is an action that launches the app with parameters identical to the normal launch emulated by the preload operation. In some embodiments, agent 50 may verify that the parameters are indeed the same (e.g., by verifying that the intent to launch the app by the user has identical parameters to the intent used to preload the app).

The above scenario demonstrates a common denominator among many uncommon flows associated with preloading: An uncommon flow may occur when the user accesses the app within no more than a predefined time period after a preload-related action. When the user access occurs too closely (within no more than the predefined time period) after the preload-related action, agent 50 may modify the PLS to eliminate the uncommon flow. In the present context, the term "user access" refers to various user interactions with the app, e.g., clicking on the app launcher icon itself, clicking on a notification associated with the app, etc.

The allowed time period (time period for which the replacement of uncommon flow(s) with common flow(s) is correct) between the preload-related action (e.g., start of preloading) and the subsequent user access can be defined in various ways. In some embodiments, agent 50 preloads an app in two stages, referred to as "foreground simulation" (FS) and "preloaded background" (PB). Such processes, including various criteria for transitioning from FS to PB, are addressed in PCT International Publication WO 2021/161174, entitled "Preloading of Applications and In-Application Content in User Devices," cited above. In such embodiments, agent 50 declares an uncommon flow if the user accesses the app during the foreground simulation stage, and modifies the PLS to replace the uncommon flow. If the user accesses the app after it has transitioned to the preloaded background stage, agent 50 retains the existing PLS.

In some embodiments, agent 50 declares an uncommon flow if the user accesses the app within a defined short interval from the start of preloading. This interval is typically configured independently of other timeouts such as the foreground simulation timeout, if one exists. For example, the foreground simulation timeout may be set to sixty seconds, whereas the allowed interval (below which the uncommon flow is replaced) is set to five seconds. Alternatively, any other suitable values can be used.

In some embodiments, agent 50 decides whether or not to declare an uncommon flow, depending on the progress of the loading of the app at the time of user entry, e.g., depending on whether the app has reached a certain state. For example, in one embodiment agent 50 declares an uncommon flow if the app has not launched the last activity in its launch sequence, or if the app is still in its "splash screen" stage, at the time of user entry.

In some embodiments, upon identifying that the user has accessed the app shortly after the beginning of preloading (using any of the criteria above, or any other suitable criterion), agent 50 terminates the preload operation and then reverts to launch the app normally (i.e., as if it were not preloaded).

In some embodiments, termination of preload may involve clearing (e.g., finishing) the preloaded task and/or killing the preloaded app's process. In the present context, the terms "clearing" and "finishing" are used interchangeably and mean both (i) destroying the activities of the preloaded task and (ii) removing the records of the destroyed activities from memory. In these embodiments, the modified PLS comprises a single common flow of launching the app from scratch.

Avoiding Uncommon Flows Due to Killing and Revival of an App Activity During Launch Sequence For an additional example of an uncommon flow, consider the following scenario:
1. Preloading of an app starts.
2. The preloaded process is quickly killed by the OS, and/or an activity is destroyed by the OS (but not due to being finished by the app).
3. User accesses the app.

In this scenario, the uncommon flow comprises reviving an app (or activity) that was killed during an initial stage of loading (e.g., during its "splash screen" stage). In normal usage (i.e., not involving preloading) it is hard or even impossible for a user to cause such a flow, given that the OS is very unlikely to kill an app while it is loading in the foreground. In the context of preloading, on the other hand, the app's process may be of lower priority and therefore may have to be killed by the OS as conditions change.

Therefore, in some embodiments, once a preloaded app's process is killed, or a preloaded app is destroyed by the OS (but not due to being finished by the app), agent 50 clears (e.g., finishes) the associated app and its activities. In some embodiments, agent 50 clears the app and its activities as soon as the killing/destroying of the app is detected. In some embodiments, agent 50 clears the app and its activities on transition from the foreground simulation stage to the preloaded background stage.

In some embodiments, agent 50 clears the app and its activities on the next user entry to the app, so that clearing is performed first, if needed, and only then the system performs the regular handling of the user entry request. In this manner, the handling of user entry will be performed normally, and in a situation where the app does not have any existing activities and activity records.

In some embodiments, agent 50 clears the app and its activities if the app's process was killed within a defined short interval from the start of preloading. Here, too, the interval is typically configured independently of other timeouts, such as the foreground simulation timeout, if one exists. For example, the foreground simulation timeout may be set to sixty seconds, whereas the interval allowed for clearing due to the app's process being killed is set to five seconds. Alternatively, however, any other suitable values can be used.

In some embodiments, agent 50 decides whether to clear the app and its activities depending on the progress of the loading of the app when it was killed, e.g., depending on whether the app has reached a certain state at the time of user entry. For example, clearing may be performed if, at the time of user entry, the app has not yet launched the last activity in its launch sequence, or if the app is still in its "splash screen" stage.

Figure 2:
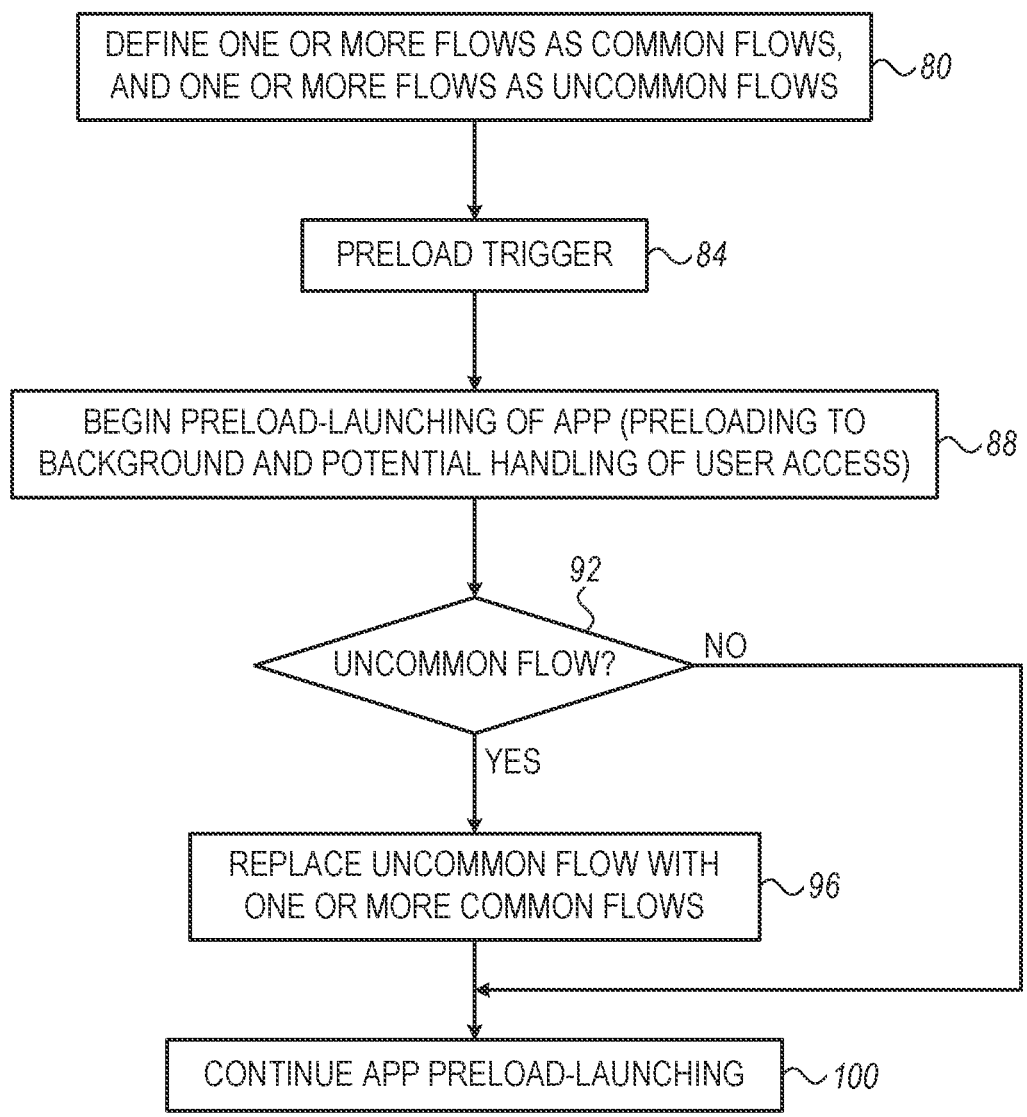
FIG. 2 is a flow chart that schematically illustrates a method for preloading and launching an application while avoiding uncommon flows, in accordance with an embodiment of the present invention.

FIG. 2 is a flow chart that schematically illustrates a method for preloading and launching an application while avoiding uncommon flows, in accordance with an embodiment of the present invention. The method begins at a flow definition stage 80, with agent 50 defining one or more of the possible flows as common, and one or more other flows as possible but uncommon. At a trigger stage 84, agent 50 decides to preload a certain app 26. At an initiation stage 88, agent 50 begins preload-launching of the app.

At an uncommon flow checking stage 92, agent 50 checks whether an uncommon flow has occurred during the preload-launch so far. If not, agent 50 continues the preload-launch procedure, at a preload-launching stage 100. If an uncommon flow has been detected, agent 50 replaces the uncommon flow with one or more common flows, at a PLS modification stage 96, and then proceeds to stage 100.

App Preloading in the Presence of User Actions Based on Recent Interaction with App Running an app in user device 24, whether preloaded or user-initiated, in the background or in the foreground, typically involves launching one or more UI displays by processor 44. The description that follows will refer to Android Activities, as a non-limiting example of UI displays. Examples of activities comprise a main activity of the app, a "Splash" screen (an initial screen that is displayed while the main activity is being loaded or prepared), an interstitial advertisement that is displayed upon transition between screens, a screen triggered by the user clicking on a notification from an app's portal, or any other suitable type of activity.

In some practical scenarios, a user-initiated activity may be invoked while one or more preload-initiated activities are running on processor 44. Similarly, a preload-initiated activity may be invoked while one or more user-initiated activities are running on processor 44. A preload-initiated activity can also be invoked while one or more other preload-initiated activities are running.

Consider, for example, a preloaded app that is running in the background. As part of running the preloaded app, preloading agent 50 may, for example, invoke a Splash activity that loads the app. The Splash activity may invoke a main activity of the app, e.g., a landing page, and the main activity may invoke an interstitial ad activity. As another example, preloading agent 50 may directly invoke the main activity that in turn invokes an interstitial ad activity. All of these activities are preload-initiated activities.

While one or more such preload-initiated activities are running, the user of user device 24 may, for example, click on a notification window of the same app that is unrelated to the preload operation. The notification may originate, for example, from a portal 28. This user action may invoke one or more user-initiated activities of the same app, which are unrelated to the preload. For example, the user click may open some content item within the app in a separate activity. As another example, the user may click on a widget of the app, which triggers creation of an app activity unrelated to the preload. As yet another example, the user may enter the app in question from within another app, so as to again invoke an app activity unrelated to the preload.

The above scenarios are depicted purely by way of example, to demonstrate how processor 44 may need to handle preload-initiated activities and user-initiated activities of the same app at the same time. The techniques described herein are applicable in these example scenarios and in any other suitable scenario.

In some embodiments, in order to handle the various activities properly, it is important to distinguish between preload-initiated activities and user-initiated activities (also referred to as "preload-activated" and "user-activated" activities, respectively). In practice, however, preloading agent 50 does not always have, or have straightforward access to, an explicit distinction between the two activity types. In some cases the app itself may not have this information either, or may not have straightforward access. In some cases, determining the distinction is complicated by the fact that apps are capable of launching activities using their own operating code (and often do). Moreover, apps may generally be allowed to run code while they are not in the foreground.

In some embodiments of the present invention, preloading agent 50 uses various tests or criteria (the two terms being used interchangeably herein) to assess whether a newly-invoked activity is preload-initiated or user-initiated. The preload agent handles the activity differently, depending on the assessment.

For the sake of clarity, the description that follows refers to agent 50 as the entity that uses the disclosed techniques for distinguishing between preload-initiated activities and user-initiated activities. In alternative embodiments, however, this assessment or distinction can be performed by any other suitable software running in processor 44, e.g., by the app itself.

Further aspects of distinguishing between preload-initiated activities and user-initiated activities are addressed in U.S. patent application Ser. No. 16/968,652, entitled "Application Preloading in the Presence of User Actions," cited above. In some embodiments, one or more of the criteria described herein can be evaluated in addition to, or in combination with, one or more of the criteria described in the above-cited patent application.

In some embodiments, agent 50 decides whether a certain activity of an app is preload-initiated or user-initiated depending on whether the user has interacted with the app recently (e.g., during a predefined recent time period). If the user recently interacted with the app, agent 50 concludes that the activity is most likely user-initiated. If the user did not interact with the app recently, agent 50 concludes that the activity is most likely preload-initiated.

Figure 3:
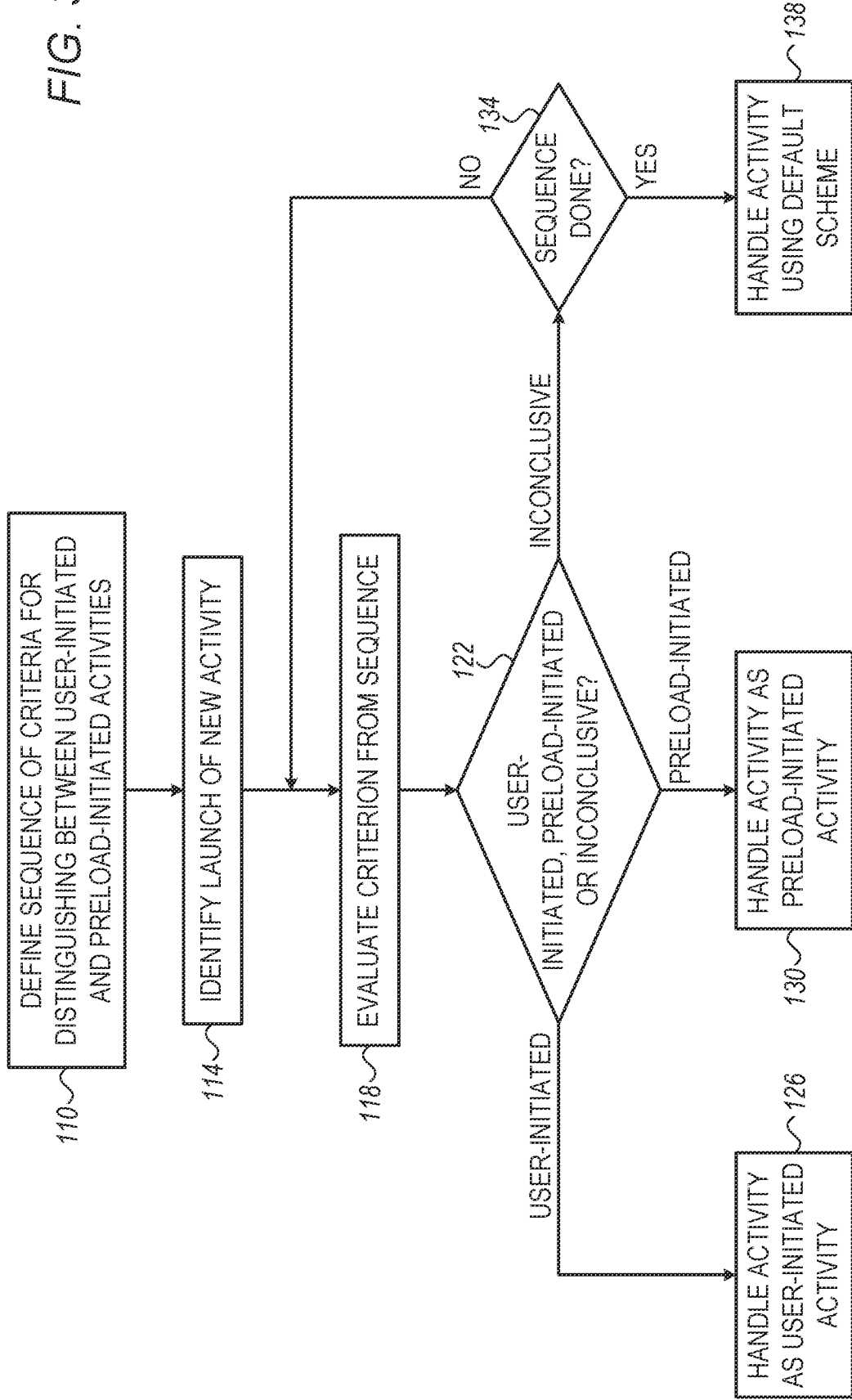
FIG. 3 is a flow chart that schematically illustrates a method for distinguishing between preload-initiated and user-initiated launching of UI displays, in accordance with an embodiment of the present invention.

FIG. 3 is a flow chart that schematically illustrates a method for distinguishing between preload-initiated and user-initiated launching of UI displays, in accordance with an embodiment of the present invention. The method begins by defining a sequence of criteria (also referred to as "tests") for distinguishing between a user-initiated activity and a preload-initiated activity, at a criteria definition stage 110. Typically, each test in the sequence is capable of returning three possible results: (i) the activity launch is user-initiated, (ii) the activity launch is preload-initiated, and (iii) inconclusive. The sequence of criteria is typically predefined and programmed in preload agent 50.

At a launch identification stage 114, agent 50 identifies a launch of a new activity. In response to identifying the activity launch, agent 50 begins to evaluate criteria in the sequence.

At a criterion evaluation stage 118, agent 50 evaluates a criterion from the sequence with respect to the newly launched activity. At a result checking stage 122, agent 50 checks whether the test result is conclusive or not, and if conclusive, whether the activity launch is assessed to be user-initiated or preload-initiated.

If the test result indicates that the activity launch is user-initiated, agent 50 handles the activity as a user-initiated activity, at a user-initiated handling stage 126. If the test result indicates that the activity launch is preload-initiated, agent 50 handles the activity as a preload-initiated activity, at a preload-initiated handling stage 130.

If the test result is inconclusive, agent 50 proceeds to the next criterion in the sequence, if one exists. At a completion checking stage 134, agent 50 checks whether all the criteria in the sequence have been evaluated. If not, the method loops back to stage 118 above, for evaluating the next criterion in the sequence.

If the entire sequence has been exhausted, agent 50 reverts to handle the activity using a default scheme defined for inconclusive cases, at a default handling stage 138. The default scheme may be identical to the user-initiated handling scheme (of stage 126), identical to the preload-initiated handling scheme (of stage 130), or different from both schemes.

In various embodiments, agent 50 may evaluate various sequences of tests. Some tests may depend on "Activity Launch Restrictions" that are enforced by OS 48. In some OSs, such as the Android 10 OS, "Activity Launch Restrictions" means that the OS limits the capability of apps to launch activities to the foreground based on various situational criteria, and specifically based on whether the user may currently be expecting to see the app's activities. For example, the OS may forbid an app from launching an activity to the foreground if the user is not currently interacting with this app.

One non-limiting example sequence of tests is the following:

1. A test that checks whether the activity was launched directly by the preload mechanism. If so, the activity is regarded as preload-initiated. For example, the preload mechanism may launch the app's entry-point activity (sometimes referred to as the launcher activity or splash screen).
2. A test that checks whether the activity was launched from another activity. In the Android OS, for example, this property may be determined by checking whether the context of the launch request is an activity. If the launch originated from another activity, the launch type (user-initiated or preload-initiated) is determined based on the preload state of that other activity ("calling activity"). If the calling activity is preloaded, the present launch regarded as preload-initiated. If the calling activity is non-preloaded, the launch will be regarded as user-initiated. Otherwise, i.e., if the launch request was not from another activity, the test result is set to "inconclusive."
3. A test that checks whether the launch was performed by one app acting on behalf of a different app. If so, the launch is determined to be user-initiated. This scenario may occur, for example, when a system notification is clicked and directly launches an activity, or when the user launches an app via a system shortcut. In the Android OS, such cases can be detected by comparing the two calling User Ids (UIDs) involved in the launch request.
4. A test that checks whether the caller app (the app that requested the activity launch) has a preloaded task. If not, the launch is determined to be user-initiated, assuming that one app normally does not launch activities of another app during the former app's launch sequence.
5. A test that checks whether the target task (the task to which the launched activity is to belong), if such a task already exists prior to the launch, is a preloaded task. If not, the launch is determined to be user-initiated.
6. A test that checks whether the activity launch was determined to be restricted by Activity Launch Restrictions of OS 48. If not restricted, the launch is determined to be user-initiated.

In test #6 above, restriction of a launch may be based on any of the following, for example:

Agent 50 may examine an OS state associated with the launch, such as a flag indicating "this launch is restricted".

Agent 50 may perform the same logic ("mimic" the logic), in whole or in part, which the OS normally uses to determine whether the launch is restricted. For example, agent 50 may perform only the part of the logic related directly to user actions, such as checking whether the user recently interacted with an element of the app, while not performing the parts of the logic which check whether the app has special permissions allowing the app to bypass the restrictions.

Agent 50 may check whether the app launched a previous user-initiated activity which the OS considered non-restricted, after the current preload was initiated for this app, and within a short time interval from the present time. If so, the launch is considered non-restricted. As motivation for this check, consider the following scenario:

a. The app has a preloaded task.
 b. The app opens a separate non-preloaded task with an unrestricted launch. At this point, the app has two tasks. Note that the preloaded task may remain preloaded at this point.
 c. Within a short time interval, the app opens an additional activity in the preloaded task. At this point, agent 50 may use the information of the recent unrestricted launch to consider this launch unrestricted as well.

In some embodiments, the time interval is fixed, for example to a few seconds. In some embodiments, when the OS has a "grace period" following a user-activated launch during which it ignores activity launch restrictions for an app, the time interval may be chosen based on the grace period, such as being the same as the grace period.

In some embodiments, the order of the criteria in the sequence is set so that tests that are most likely to produce a conclusive result appear first. In an example embodiment, test #2 above is placed first in the sequence, so that subsequent tests are only used for launches that are not associated with a caller activity. Alternatively, any other suitable order can be set.

Use of Temporary Start Window on User Entry to a Preloaded App

When a user enters a preloaded app 26, e.g., by clicking on the app icon in the launcher screen of user device 24, the top activity (or, more generally, the top UI display) of the app has to be resumed before it can be displayed to the user. Although the top activity may already be partially or even fully preloaded, the app may need additional time to fully prepare the top activity for display, e.g., to process the relevant activity lifecycle events of the top activity being resumed. Therefore, unless suitable measures are taken, display screen 56 will not show any activity from the user's click until the top activity is fully resumed. This time gap is likely to cause an undesired response latency that is well noticed by the user.

In some embodiments of the present invention, OS 48 (typically preload agent 50) displays a temporary window, referred to herein as a "preload starting window", on screen 56 from the moment the user clicks to enter a preloaded app until the app top activity is displayed. The preload starting window typically comprises a static display that can be rendered with minimal effort (and therefore rapidly) by the OS, bridging over the possible latency from the user's click until the preloaded app top activity is resumed and can be displayed. When the top activity is resumed and can be displayed, OS 48 removes the preload starting window from screen 56 and displays the top activity instead.

In some embodiments, OS 48 builds the graphics of the preload starting window based on the app theme, i.e., in accordance with the general look and styling of the app. In some embodiments, OS 48 builds the graphics of the preload starting window based on the theme of the top activity being resumed, i.e., in accordance with the general look and styling of the top activity. In the Android OS, for example, the theme of the app and/or top activity are existing attributes that can be queried and used for the preload starting window.

In some embodiments, during the preloading procedure, OS 48 builds a snapshot image of the app being preloaded and uses this snapshot image as the preload starting window. In some embodiments, the OS builds the snapshot image when transitioning from the Foreground Simulation (FS) stage to the Preloaded Background (PB) stage, as defined above. Alternatively, the OS may acquire the snapshot image at any other suitable time.

In some embodiments, on user entry to a normally-launched (non-preloaded) app, the OS presents a temporary window. In the Android OS, for example, this temporary window is sometimes referred to as a "Starting Window". In some embodiments, OS 48 builds and presents the preload starting window in a manner that preserves the user experience of the temporary window used for normal launching of apps.

In embodiments in which the preload starting window is based on an activity theme, the goal of preserving the user experience of the normal temporary window (as used for non-preloaded apps) introduces the problem of selecting which activity to base the preload starting window on.

If the activity being entered to (following preload) were chosen, then when entering a preloaded app this activity may be, for example, the "Main" activity of the app, instead of the usual activity being entered to when the app is normally launched from scratch (e.g., the "Splash" activity). In such a case, the preload starting window would be based on a different activity than the usual activity used for launch-from-scratch (i.e., in absence of preloading). Moreover, in the Android OS, when the user normally launches a previously backgrounded app, the OS will in most cases display a snapshot image as the temporary window. In some cases, however, using a snapshot image as the preload starting window is not possible or undesired.

Thus, if the OS were to build the preload starting window based on the activity being entered to (as a naïve solution would likely do), the user experience of the temporary window in preload may be significantly different than that of normal, non-preloaded launch. This difference is problematic, for example, since app developers invest less effort ensuring a high-quality user experience for a temporary window for non-initial activities (those other than the Splash), because it is considered uncommon for the user to get the experience of a temporary window based on those activities.

To overcome the above-described problem, in some embodiments OS 48 builds the preload starting window based on the first activity that the user would have seen, when launching from scratch, had not the app been preloaded. This activity (or more generally, UI display) is referred to herein as the First Viewed Activity (FVA). In some embodiments, 48 OS builds the graphics of the preload starting window based on the FVA. In some embodiments, the FVA is the first non-transparent activity normally created by the app. In some embodiments, the FVA is the first non-transparent activity created by the app during preload.

In some embodiments, OS 48 saves the starting window user experience data (e.g., graphics) of the FVA during the preloading procedure, and uses it to synthesize the same starting window experience upon user entry to the preloaded app.

Figure 4:
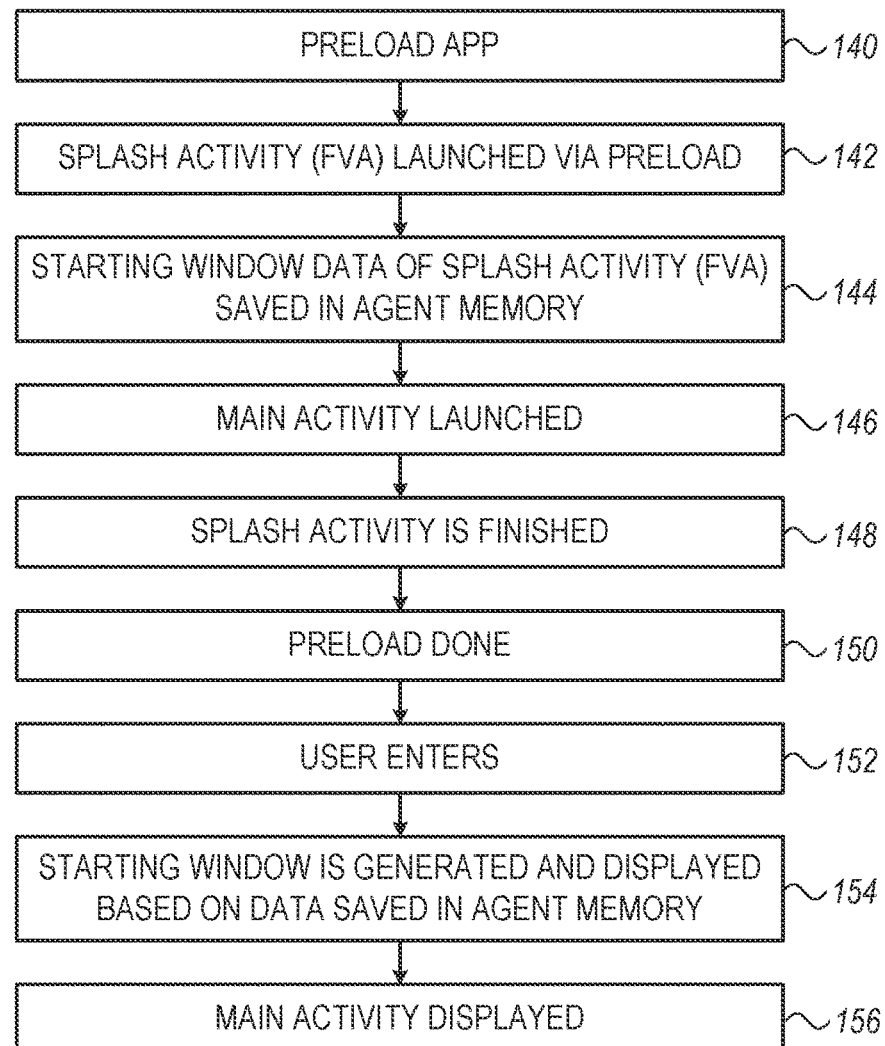
FIG. 4 is a flow chart that schematically illustrates a method for preload-launching an application using a preload starting window, in accordance with an embodiment of the present invention.

FIG. 4 is a flow chart that schematically illustrates a method for preload-launching an application using a preload starting window, in accordance with an embodiment of the present invention. The method is carried out by OS 48, typically but not necessarily by preload agent 50. The method begins with OS 48 starting preloading of a certain app 26, at a preloading stage 140. At an FVA launching stage 142, agent 50 launches the Splash activity (FVA) of the app in the background. At a saving stage 144, agent 50 saves the starting window data of the Splash activity in the memory of agent 50. At a main activity launch stage 146, agent 50 launches the main activity of the app. At a Splash finishing stage 148, agent 50 finishes the Splash activity. At a preload ending stage 150, agent 50 concludes the preload operation.

At some point in time, the user accesses app 26, at a user entry stage 152. Upon detecting the user entry, agent 50 generates and displays the preload starting window on screen 56 based on the data that was saved at stage 144 above, at a starting window displaying stage 154. At a top activity display stage 156, agent 50 displays the main activity of the app. At this stage the app is ready for user interaction.

Managing Focus for Preloaded Apps Based on Per-Container (e.g., Per-Display) Focus In some OSs, for example Android, part of the state of an app 26 is its 'focus' state. Correct handling of the focus state during preload is useful for complete and accurate preloading of apps, while minimizing per-app integration efforts. In some OSs, Android 11 being one example, the OS includes app containers, such as Android's displays, with a 'focus' state per container.

In some embodiments that are described below, preload agent 50 preloads apps while maintaining the proper 'focus' state for the preloaded apps and all other apps, based on the existing per-container 'focus' defined by the OS. In the embodiments described herein, the basic "unit of focus" (the entity inside an app for which focus is defined) is a window. Alternatively, however, the disclosed techniques can be used with any other suitable unit of focus, for example entire apps.

The description that follows refers mainly to per-display focus, as an example of per-container focus. This choice, however, is made purely for the sake of clarity. The disclosed technique are not limited to displays and can be used with any other suitable type of containers.

In some embodiments, the OS supports multiple displays. The OS defines a 'focused window' (a window that is in focus) per display. The focused window of a display displayId is denoted perDisplayFocusedWindow(displayId). When a focused window is transferred from display A to display B, first the window focus is handled inside display B, then the window is set as perDisplayFocusedWindow(B), and then the window focus is handled inside display A—deleting the window from being perDisplayFocusedWindow (A). The OS typically also maintains a 'focus' state for each window. The focus state of a window windowId is denoted isWindowInFocus(windowId). This state may, for example, be sent to the window or app via events for gaining or losing focus.

In some embodiments, when preloading an app, preload agent 50 simulates the focus state management for windows of preloaded apps, as if they were launched normally.

In an embodiment, when preloading an app, preload agent 50 executes the same focus decision logic as if the app were launched normally. For example, agent 50 may ensure that a window marked as 'non-focusable' (i.e., a window that is ineligible to receive focus when launched normally) will not be eligible to receive focus even when it belongs to a preloaded app.

In some embodiments, the multiple displays supported by the OS comprise a "default display" (also referred to as a target display—a display that is linked to the physical display screen 56 seen by the user) and one or more "virtual displays" (which are logical constructs, e.g., containers, that are not visible to the user but enable rendering of windows). Agent 50 renders a preloaded app in a virtual display, which is referred to as a "preload display". Further aspects of preloading using virtual displays are addressed in PCT International Publication WO 2021/161174, cited above.

In some embodiments, upon preloading an app, agent 50 defines the app as eligible to receive focus in the preload display, such as by considering the app visible and focusable. As such, at the beginning of a preload operation, perDisplayFocusedWindow(preloadDisplay) will be set by agent 50 to the preloaded window, and the isWindowInFocus of the window will be set by agent 50 to 'true'.

In some embodiments, after the Foreground Simulation stage of the preload operation is completed, agent 50 removes the eligibility of the window to receive focus, such as by considering the app either invisible and/or non-focusable. Thus, agent 50 sets perDisplayFocusedWindow (preloadDisplay) to none (e.g., empty/null), and sets the isWindowInFocus of the window to 'false'.

In some embodiments, upon transferring a preloaded app to the target display (typically the physical display, for consumption of the content by the user), the focus state is managed based on the Foreground Simulation state at the time of transfer:

If the preloaded app was not in the Foreground Simulation state, but rather in the Preload Background state, the OS will treat the focus normally—changing state as expected. For example, if the app is brought to foreground, the app's window will receive focus, the previous foreground app in the target display will lose focus, and perDisplayFocusedWindow(targetDisplay) will be set to the previously-preloaded window.

If the preloaded app was in the Foreground Simulation state, the app was considered in focus. In some embodiments, the app's focus state is changed to non-focused inside the preloaded display, and then the app is transferred to the target display and its state is changed to focused. In some embodiments, the app will not receive a focus-loss message, and will receive another focus-gain message from the target display. To this end, before sending the focus-loss message inside the preload display, the OS checks whether the window is already marked as perDisplayFocusedWindow(targetDisplay). If so, the OS skips sending the focus-loss message. In some embodiments, the app will not receive any additional focus messages at this time, and will stay in focus. To this end, in addition to possibly avoiding the focus-loss message as described above, before sending the focus-gain message inside the target display, the OS checks whether the window is already marked as perDisplayFocusedWindow for any preload display, and if so, skips sending the focus-gain message.

Figure 5:
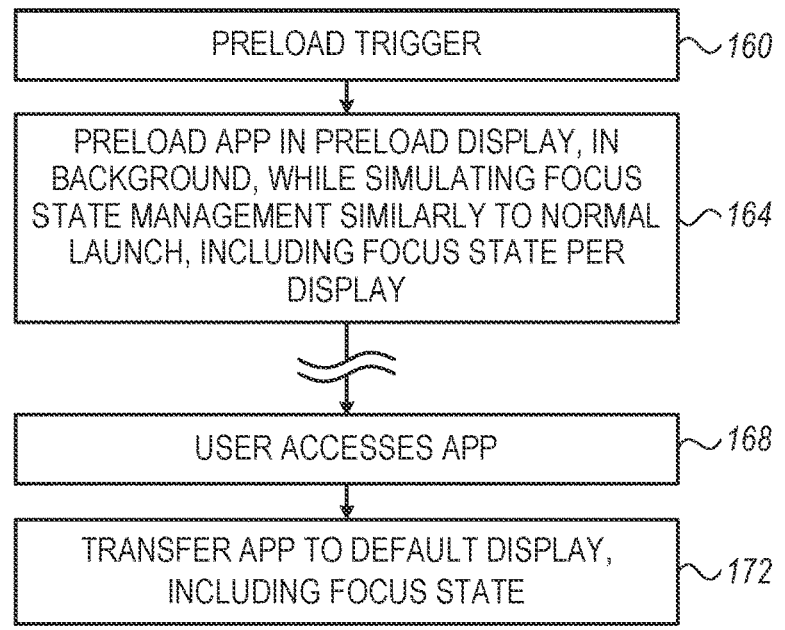
FIG. 5 is a flow chart that schematically illustrates a method for focus state management in preloading an application, in accordance with an embodiment of the present invention.

FIG. 5 is a flow chart that schematically illustrates a method for focus state management in preloading an application, in accordance with an embodiment of the present invention. The method begins at a trigger stage 160, with preload agent 50 deciding to preload a certain app 26. At a preloading stage 164, agent 50 preloads the app in a virtual display, also referred to as a preload display.

In preloading the app in the preload display, agent 50 performs various actions such as pre-rendering one or more windows of the app. In performing these actions, agent 50 executes the same focus-state management logic that is used for normal preloading of apps. This logic includes, inter alia, defining a focus state per display, in this example defining a focus state for the preload display in which the app is preloaded.

At some later point in time, the user accesses the app, at a user entry stage 168. Upon detecting the user entry, agent 50 transfers the app to the default display (also referred to as a target display) for displaying to the user, at a transfer stage 172. Focus management continues according to the same logic in the target display.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A user device, comprising:
   a display screen; and
   one or more processors, configured to:
      run an Operating System (OS) that runs user applications, including sending flows to the user applications, each flow comprising a series of inputs that are sent over time to a given user application and determines a lifecycle of the given user application;
      preload-launch a user application, including preloading the user application in a background mode that is invisible on the display screen, and, upon user access to the preloaded user application, transferring the user application to a foreground mode that is visible on the display screen; and
      in response to identifying that preload-launching of the user application comprises a flow that is predefined as an uncommon flow, replace the flow with one or more alternative flows that are not defined as uncommon flows.

2. The user device according to claim 1, wherein the one or more processors are configured to identify the uncommon flow in the preload-launching of the user application, by identifying that the user access is within a predefined time period after a preload-initiated action.

3. The user device according to claim 2, wherein the preload-initiated action is a beginning of preloading the user application.

4. The user device according to claim 2, wherein the one or more alternative flows comprise a flow that moves the user application silently to a front, without triggering callbacks of the user application.

5. The user device according to claim 1, wherein the one or more alternative flows comprise the following sequence of flows:
   a first flow that launches the user application;
   a second flow that moves the user application to the background mode; and
   a third flow that, upon user entry, moves the user application from the background mode to a foreground mode.

6. The user device according to claim 1, wherein the one or more processors are configured to identify the uncommon flow in the preload-launching of the user application, by identifying that the user accesses the user application following one of:
  killing of a process of the user application by the OS; and
  destroying of a User Interface (UI) display of the user application by the OS.

7. The user device according to claim 6, wherein the one or more processors are configured to replace the uncommon flow with an alternative flow that finishes the user application and one or more User Interface (UI) displays of the user application.

8. The user device according to claim 1, wherein, in response to identifying the uncommon flow, the one or more processors are configured to terminate preloading of the user application.

9. The user device according to claim 1, wherein, in accordance with one or more of the alternative flows, the one or more processors are configured to,
  upon user access to the preloaded user application:
    display on the display screen a preload starting window;
    while the preload starting window is displayed, execute user-entry actions for preparing the user application for interaction with the user; and
    upon completion of the user-entry actions, remove the preload starting window and enable the user to interact with the user application.

10. The user device according to claim 9, wherein, upon completion of the user-entry actions, the one or more processors are configured to replace the preload starting window with a top User Interface (UI) display of the user application on the display screen.

11. The user device according to claim 10, wherein the one or more processors are configured to determine a theme of the top UI interface or of the user application, and to build the preload starting window using the determined theme.

12. The user device according to claim 9, wherein the one or more processors are configured to acquire a snapshot image of the user application during preloading, and to use the snapshot image as the preload starting window.

13. The user device according to claim 9, wherein the one or more processors are configured to build the preload starting window having a same user experience as a starting window used for non-preloaded user applications.

14. The user device according to claim 9, wherein the one or more processors are configured to build the preload starting window having a same user experience as a first User Interface (UI) display that the user would have seen when launching the user application without pre loading.

15. A method, comprising:
  in a user device, running an Operating System (OS) that runs user applications, including sending flows to the user applications, each flow comprising a series of inputs that are sent over time to a given user application and determines a lifecycle of the given user application;
  preload-launching a user application, including preloading the user application in a background mode that is invisible on a display screen of the user device, and, upon user access to the preloaded user application, transferring the user application to a foreground mode that is visible on the display screen; and
  in response to identifying that preload-launching of the user application comprises a flow that is predefined as an uncommon flow, replacing the flow with one or more alternative flows that are not defined as uncommon flows.

16. The method according to claim 15, wherein identifying the uncommon flow comprises identifying that the user access is within a predefined time period after a preload-initiated action.

17. The method according to claim 16, wherein the preload-initiated action is a beginning of preloading the user application.

18. The method according to claim 16, wherein the one or more alternative flows comprise a flow that moves the user application silently to a front, without triggering callbacks of the user application.

19. The method according to claim 15, wherein the one or more alternative flows comprise the following sequence of flows:
  a first flow that launches the user application;
  a second flow that moves the user application to the background mode; and
  a third flow that, upon user entry, moves the user application from the background mode to a foreground mode.

20. The method according to claim 15, wherein identifying the uncommon flow comprises identifying that the user accesses the user application following one of:
  killing of a process of the user application by the OS; and
  destroying of a User Interface (UI) display of the user application by the OS.

21. The method according to claim 20, wherein replacing the uncommon flow comprises replacing the uncommon flow with an alternative flow that finishes the user application and one or more User Interface (UI) displays of the user application.

22. The method according to claim 15, wherein replacing the flow comprises terminating preloading of the user application in response to identifying the uncommon flow.

23. The method according to claim 15, wherein one or more of the alternative flows comprise,
  upon user access to the preloaded user application:
    displaying on the display screen a preload starting window;
    while the preload starting window is displayed, executing user-entry actions for preparing the user application for interaction with the user; and
    upon completion of the user-entry actions, removing the preload starting window and enable the user to interact with the user application.

24. The method according to claim 23, wherein removing the preload starting window comprises replacing the preload starting window with a top User Interface (UI) display of the user application on the display screen.

25. The method according to claim 24, and comprising determining a theme of the top UI interface or of the user application, and building the preload starting window using the determined theme.

26. The method according to claim 23, and comprising acquiring a snapshot image of the user application during preloading, and using the snapshot image as the preload starting window.

27. The method according to claim 23, and comprising building the preload starting window having a same user experience as a starting window used for non-preloaded user applications.

28. The method according to claim 23, and comprising building the preload starting window having a same user experience as a first User Interface (UI) display that the user would have seen when launching the user application without preloading.

\* \* \* \* \*